United States Patent [19]
Perkins et al.

[11] Patent Number: 4,997,358
[45] Date of Patent: Mar. 5, 1991

[54] APPARATUS FOR RECONFIGURING FINISHING ROLLS IN A PLASTIC SHEET FABRICATION SHEETLINE

[75] Inventors: James H. Perkins, Fredericktown; Charles C. Treisch, Jr., Mt. Gilead; Howard E. Radel, Cardington; William N. Calland, Columbus, all of Ohio

[73] Assignee: HPM Corporation, Mount Gilead, Ohio

[21] Appl. No.: 403,103

[22] Filed: Sep. 5, 1989

[51] Int. Cl.$^5$ .......................... B29C 43/24; B30B 3/04
[52] U.S. Cl. .................... 425/194; 100/168; 264/175; 425/363; 425/367
[58] Field of Search ............... 425/168, 363, 367, 182, 425/193, 194; 264/175; 72/243; 100/168

[56] References Cited

U.S. PATENT DOCUMENTS

| | | | |
|---|---|---|---|
| 3,074,114 | 1/1963 | Petry | 264/175 |
| 3,246,365 | 4/1966 | Kloender | 425/367 |
| 3,307,500 | 3/1967 | Seewer et al. | 425/367 |
| 3,820,933 | 6/1974 | Aspin | 425/367 |
| 3,936,258 | 2/1976 | Lake | 425/367 |
| 4,105,386 | 8/1978 | Thiel et al. | 425/217 |
| 4,117,054 | 9/1978 | Salo | 425/367 |
| 4,531,996 | 7/1985 | Sukenik | 425/367 |
| 4,639,346 | 1/1987 | Pav et al. | 264/280 |
| 4,784,596 | 11/1988 | Heise | 425/367 |
| 4,885,317 | 12/1989 | Thien et al. | 425/367 |

FOREIGN PATENT DOCUMENTS 2161105 1/1986 United Kingdom ............... 425/367

OTHER PUBLICATIONS

Article entitled "Plants for Extrusion of Flat Film, Thermoforming Film and Sheets", Kunststoffe German Plastics 78 (1988) 10, pp. 941/947.

*Primary Examiner*—Jay H. Woo
*Assistant Examiner*—James P. Mackey
*Attorney, Agent, or Firm*—Jeffers, Hoffman & Niewyk

[57] ABSTRACT

Apparatus for reconfiguring at least three finishing rolls in a plastic sheet fabricating sheetline includes a base, a pair of spaced upright support structures, and pairs of first and second spaced support assemblies. The upright support structures are mounted on the base and support a center one of the rolls in a stationary position therebetween and for totation about a first axis. The first support assemblies support a first outer one of the rolls therebetween for rotation about a second axis and are mounted to the support structures for permitting angularly adjustable movement of the first outer roll relative to the center roll about the first axis to reconfigure the angular position of the first outer roll relative to the center roll. The second support assemblies support a second outer one of the rolls therebetween for rotation about a third axis and are mounted to the support structures for permitting angularly adjustable movement of the second outer roll relative to the center roll about the first axis to reconfigure the angular position of the seocnd outer roll relative to the center roll.

15 Claims, 4 Drawing Sheets

APPARATUS FOR RECONFIGURING FINISHING ROLLS IN A PLASTIC SHEET FABRICATION SHEETLINE

BACKGROUND OF THE INVENTION

The present invention generally relates to a sheetline for fabrication of plastic sheet and, more particularly, to a roll reconfiguring apparatus and method for making multiple adjustments in the relative positions of finishing rolls of the sheetline to optimize the surface finish quality of the plastic sheet.

Sheetlines are known which employ a plurality of finishing rolls for rolling out a web of plastic melt outputted from an extruder die to solidify the plastic melt into sheet form. For the production of plastic sheets having optical quality finish, opposite surfaces of the sheets must be polished. In order to polish the opposite sheet surfaces, one conventional practice is to pass the web of plastic melt successively through a pair of nips formed between three finishing rolls. The surfaces of the sheets are polished by contact with the highly-polished surfaces of the finishing rolls. Also, the temperatures of the rolls are controlled for causing the proper sequence of cooling and solidifying of the respective surfaces of the sheets after they contact the rolls.

One conventional configuration of the finishing rolls is a vertical stack wherein the three finishing rolls are positioned one above the other with the pair of nips defined in between. An extruder feeds the plastic melt through a sheet die having a long narrow slit and aligned with the nip between the center and upper rolls. The web of plastic melt flows from the die in the horizontal direction into the primary or first nip where the gauge thickness of the sheet is determined by the width of the nip, or distance between the upper and center rolls. After passing through the first nip, the sheet of plastic melt wraps around the center roll where its one surface in contact with the outer polished surface of the center roll is polished by it. Next, the sheet of plastic melt passes through the second nip between the center roll and the lower roll and about the surface of the lower roll where the other opposite surface of the sheet in contact with the polished surface of the lower roll is polished by it.

However, for production of plastic sheets of optimum optical quality, the sheet surfaces to be polished must actually adhere to the respective roll surfaces. Thus, the temperature of the plastic melt must be hot enough for the sheet surfaces to stick to the respective rolls. If the web of plastic melt cools too rapidly such adherence is not possible and a poor optical quality surface finish results.

One problem with plastic sheets produced by the finishing rolls configured in the vertical stack is the tendency of the web of plastic melt, being fed horizontally by the die into the primary nip, to sag due to the effect of gravity as it emerges from the die. The sagging web of plastic melt contacts the center roll upstream of the nip for a sufficient interval of time to permit premature cooling of the plastic melt and cause inadequate adherence of the sheet to the center roll as it departs the first nip.

Also, such premature cooling of the web of plastic melt from contact with the center roll upstream of the first nip prevents air bubbles in the plastic melt from being squeezed out by passage through the nip. Instead, the air bubbles stay trapped in the sheet of plastic melt and cause imperfections in the surface finish.

One approach to overcoming the above-described problems is to reconfigure the finishing rolls from the vertical stack to an inclined stack wherein at least the upper and center rolls lie along a plane inclined at approximately 45°. With the web of plastic melt now feeding into the primary nip from the extruder die at a 45° angle, instead of in the horizontal direction, a smaller component of the force of gravity is acting on the web and thereby the tendency for the web of plastic melt to sag is less. However, some sagging still occurs. It has also been proposed to mount the lower, or third, roll for pivotal movement about the axis of the center roll to provide various possible configurations of the lower roll with the fixed pair of 45° inclined upper and center rolls.

While the 45° reconfiguration of finishing rolls is an improvement over the vertical stack, such reconfiguration is not seen as the optimum solution to the problem. Consequently, a need still exists for an approach to the positioning of the finishing roll that will overcome the above-cited problems of the prior art.

SUMMARY OF THE INVENTION

The present invention provides a finishing roll reconfiguring apparatus and method designed to satisfy the aforementioned needs. The roll reconfiguring apparatus and method of the present invention utilizes at least three finishing rolls and permits pivotal or angular adjustable movement of first and third ones of the three rolls respectively about the axis of the second roll. One roll is rotatably mounted in a stationary position. Therefore, the other two rolls are mounted for pivotal movement. The gap of the nips between the rolls remains constant. The roll reconfiguring apparatus and method of the present invention permits the making of multiple adjustments in the relative positions of the three finishing rolls between vertical and horizontal configurations for optimizing the surface finish quality of the plastic sheet.

Accordingly, the present invention is directed to apparatus for reconfiguring at least three finishing rolls of a plastic sheet fabricating sheetline. The roll reconfiguring apparatus includes first, second and third support means for rotatably mounting the three rolls about respective first, second and third axes. A support means mounts the second roll in a stationary position, whereas the first and third support means permit angularly adjustable movement of the first and third rolls respectively about the axis of the second roll.

The roll reconfiguring apparatus also includes drive means on the respective support means for independently rotatably driving the rolls. In addition, means are provided on the respective support means for adjusting the gaps of the respective nips between the first and second rolls and the second and third rolls and for maintaining the gaps constant.

In the preferred embodiment, the center roll of the three finishing rolls is stationary and the two outer rolls are angularly adjustable. Alternatively, it is possible for one of the two outer rolls to be stationary and the center roll angularly adjustable about the one outer roll's axis and then the other outer roll angularly adjustable about the axis of the center roll.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
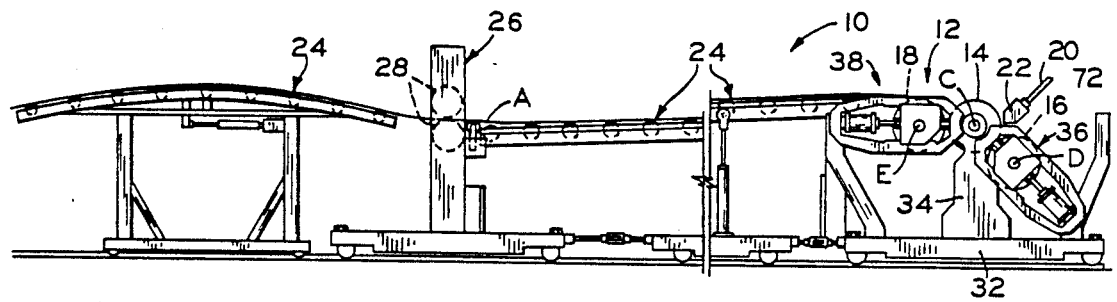
FIG. 1 is a side elevational view of a plastic sheet fabrication sheetline incorporating apparatus for reconfiguring the finishing rolls of the sheetline in accordance with the present invention.

Referring now to the drawings, and particularly to FIG. 1, there is shown a sheetline, generally designated 10, which incorporates a roll reconfiguring apparatus, indicated by the numeral 12, being constructed in accordance with the principles of the present invention. In addition to the reconfiguring apparatus 12 and three highly-polished, finishing rolls 14, 16 and 18 supported by the apparatus, the sheetline 10 also includes an extruder 20 and sheet die 22 connected therewith, tandemly-arranged roller conveyors 24 for transporting a continuous plastic sheet A from the finishing rolls 14-18 and a mechanism 26 interposed between the conveyors 24 which employs a pair of counter-rotatably driven pinch rollers 28 for pulling the sheet A along the conveyors 24.

Figure 5:
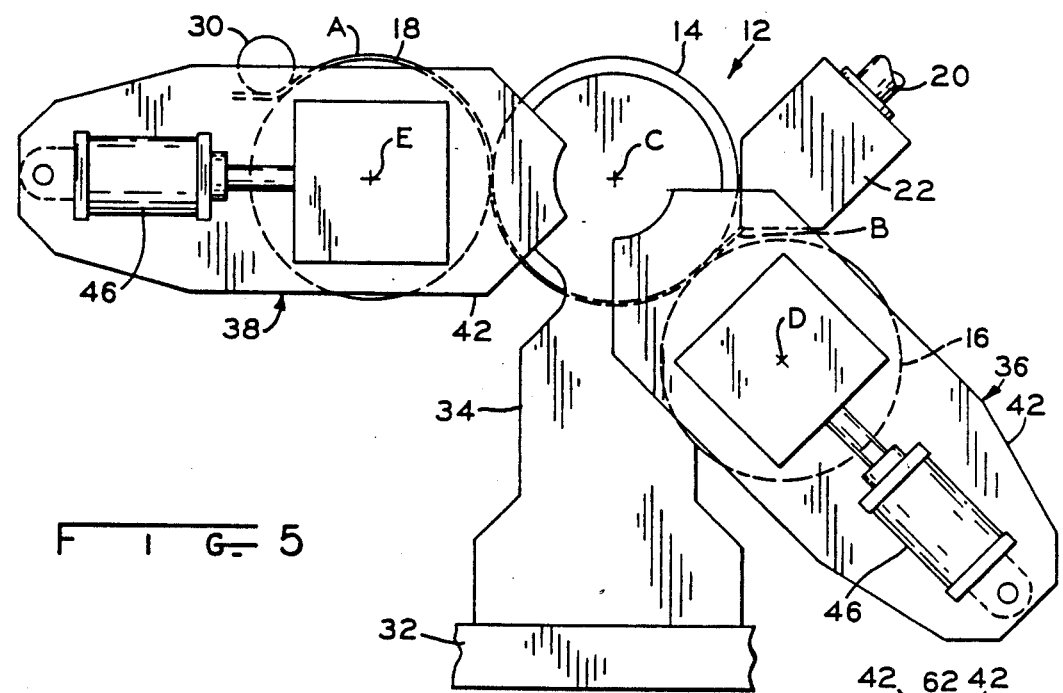
FIG. 5 is an enlarged schematic view of the roll reconfiguring apparatus of FIG. 1 showing the apparatus in conjunction with an extruder, sheet die and take-off or conveyor roll.
Figure 4:
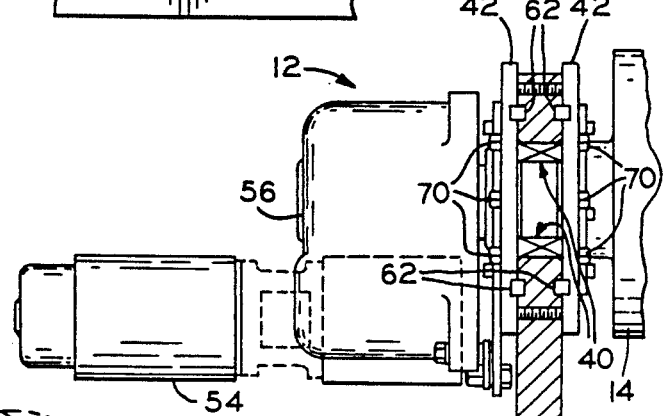
FIG. 4 is an enlarged sectional view, shown partly in elevation, of the roll reconfiguring apparatus taken along line 4—4 of FIG. 3A.

As best seen in FIG. 5, the extruder 20 feeds the plastic melt through the sheet die 22 having a long narrow slit (not shown). The plastic melt emerges from the die 22 in the form of a web B and travels between the finishing rolls 14-16-18 to produce the plastic sheet A. In the preferred embodiment, a small diameter conveyor roll 30 is provided adjacent the last one 18 of the rolls contacting the plastic sheet A to contact and remove the sheet A from contact with the roll 18.

Figure 2:
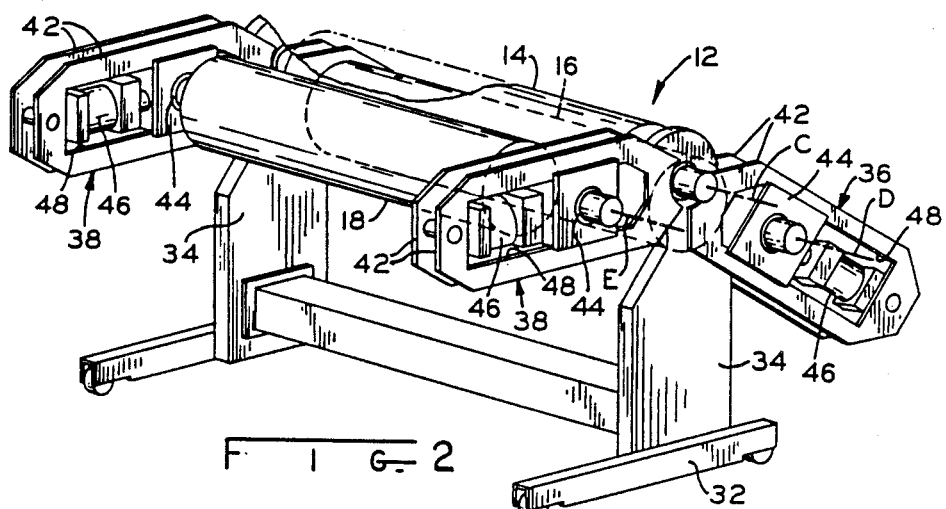
FIG. 2 is an enlarged perspective view of the roll reconfiguring apparatus of FIG. 1.

Turning to FIGS. 2-5, in its basic components, the roll reconfiguring apparatus 12 includes a base 32, a pair of upright support structures 34, and first and second pairs of support assemblies 36, 38. The upright support structures 34 of the apparatus 12 are spaced from one another and mounted to individual base rails 32. The support structures 34 support respective bearings 40 (FIG. 4) which rotatably mount opposite ends of a center one 14 of the finishing rolls in a stationary position between the support structures 34 and for rotation about a first axis C (FIGS. 1, 2 and 5).

Figure 6:
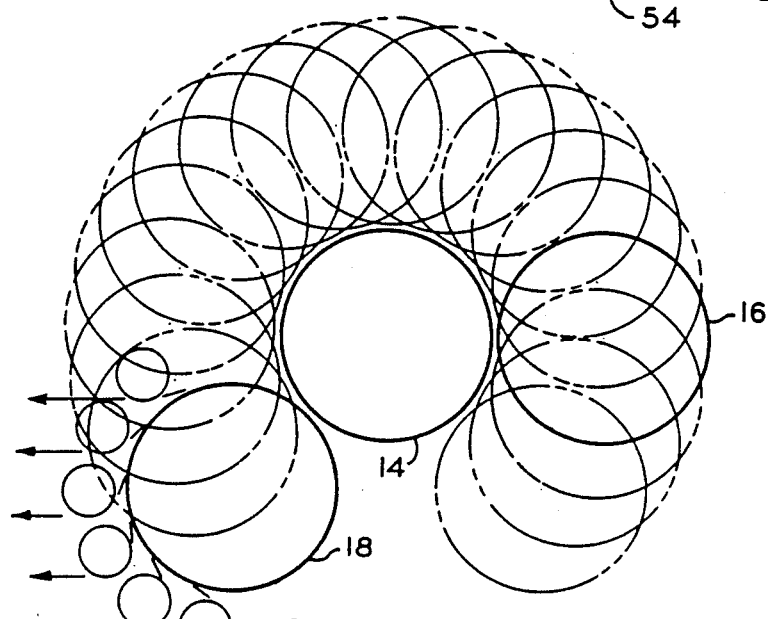
FIG. 6 is a schematic view of the three finishing rolls depicting the multiple positions of the outer two rolls about the center roll.

The first and second support assemblies 36, 38 of the apparatus 12 respectively rotatably mount first and second outer ones 16, 18 of the rolls therebetween for rotation about second and third axes D, E (FIGS. 1, 2 and 5) which extend parallel to one another and to the first axis C of the center roll 14. The first support assemblies 36 are spaced apart and mounted from one side of the respective upright support structures 34 for permitting angularly adjustable revolving movement of the first outer roll 16 relative to the center roll 14 and about the first axis C in order to reconfigure the angular position of the first outer roll 16 relative to the center roll 14. The second support assemblies 38 are spaced apart and mounted from the opposite side of the respective upright support structures 34 for permitting angularly adjustable revolving movement of the second outer roll 18 relative to the center roll 14 and about the first axis C to reconfigure the angular position of the second outer roll 18 relative to the center roll 14. FIG. 6 shows schematically the multiple positions which can be assumed by the first and second outer rolls 16, 18 about the center roll 14 and the position of roll 30 about roll 18.

More particularly, each of first and second support assemblies 36, 38 includes a pair of spaced inboard and outboard support plates 42, a roll bearing 44, and adjusting means in the form of an extendable and retractable actuator 46. The support plates 42 have identical elongated slots 48 in which the bearing 44 and actuator 46 are mounted. The bearing 44 rotatably mounts one of the opposite ends of a respective one of the first and second outer rolls 16, 18. The bearing 44 is mounted in bearing housing 45 (FIG. 3C) within the slots 48 (FIG. 3B) for adjustable sliding movement toward and away from the center roll 14. Bearing housing side plates 56 aid in aligning inner and outer support plates 42 and retain bearings 40 in a transverse direction.

The actuator 46 of each support assembly 36, 38 is mounted to and extends between the bearing 44 and outer portions of the plates 42 within the slots 48 also. The respective actuators 46 are operable for providing back-up force to the first and second outer rolls 16, 18 toward the center roll 14 to define respective nips 50 (FIG. 3A) therebetween. Once the desired gaps of the nips 50 have been set by adjusting the gap adjustment screws 51 relative to plates 42, they are maintained constant by tightening locking nuts 52.

Figure 3A:
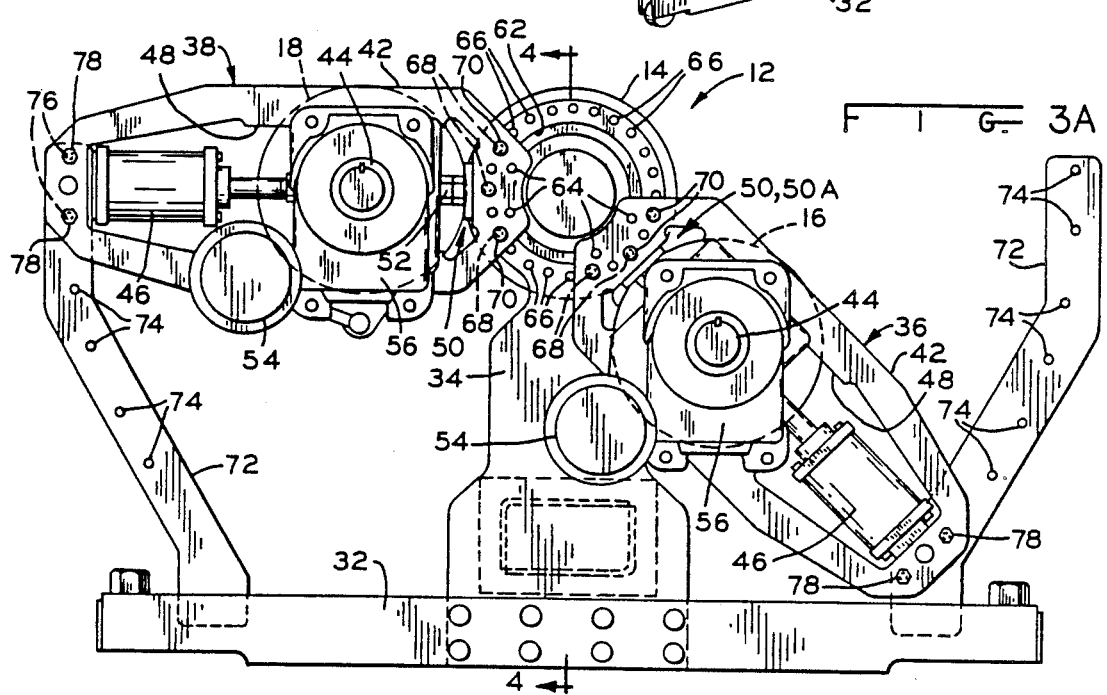
FIG. 3A is an enlarged side elevational view of the roll reconfiguring apparatus of FIG. 1.
Figure 3B:
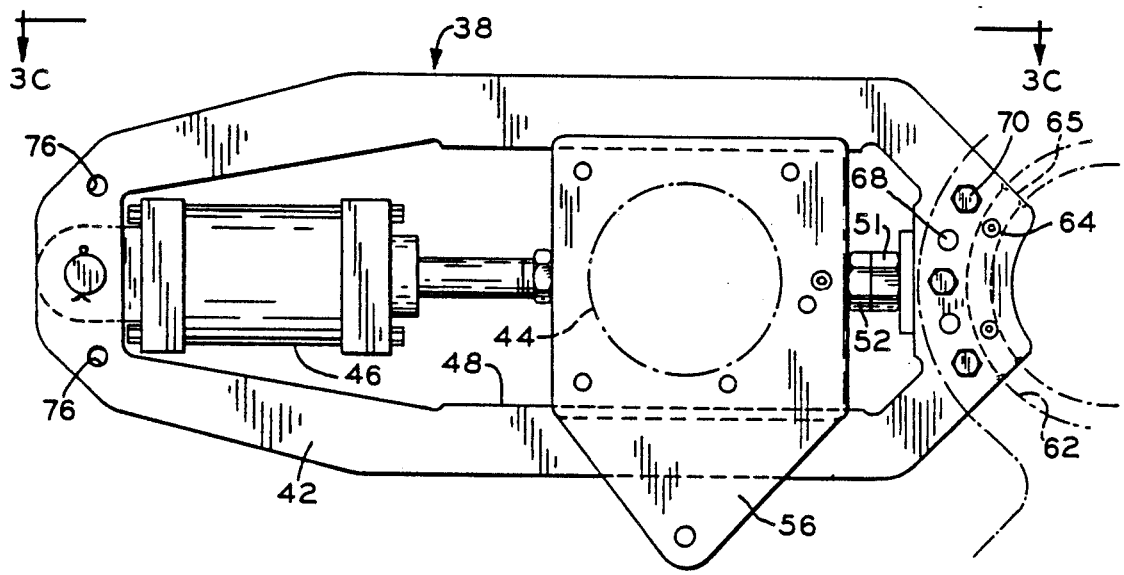
FIG. 3B is an enlarged side elevational view of a roll support assembly of the roll reconfiguring apparatus of FIG. 3A.
Figure 3C:
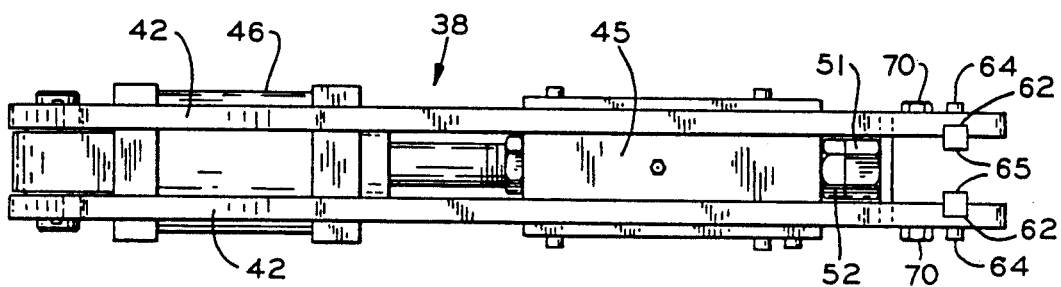
FIG. 3C is a top plan view of the roll support assembly as seen along line 3C—3C of FIG. 3B.

As mentioned previously, the center and outer rolls 14-16-18 are rotatably mounted by the upright support structures 34 and the support assemblies 36, 38. The rolls 14-16-18, preferably, have the same diameters although they can have different diameters. Each roll 14-16-18 is rotated independently of one another, though preferably at or near the same speeds. As seen in FIG. 3A, motors 54 are mounted on gear housings 56 of one of the support structures 34, one of the first support assemblies 36 and one of the second support assemblies 38 for rotatably driving, independently of one another, the respective center and first and second outer rolls 14-16-18.

Referring to FIGS. 3A-3C and 4, the first and second support assemblies 36, 38 of the apparatus 12 are coupled to the upright support structures 34 so as to permit pivotal movement of the support assemblies 36, 38 relative thereto about the first axis C of the center roll 14 and therewith the angularly adjustable revolving movement of the first and second outer rolls 16, 18 relative to the center roll 14. More particularly, means for providing the coupling includes the pair of spaced inboard and outboard support plates 42, being substantially identical in construction, attached on opposite sides of the upper end portion of each of the support structures 34. Each of the support plates 42 has a circular track 62 in the form of a continuous keyway or groove defined therein. The track 62 of the inboard support plate 42 is defined on its surface, whereas the track 62 of the outboard mounting plate 42 is defined on its surface. The circular tracks 62 are disposed in substantially parallel relation to one another and in concentric relation with the first axis C.

The coupling means further includes a plurality of coupling elements in the form of an aligned pair of keys 65 disposed on and projecting toward one another from the inner end portions of the pairs of support plates 42 of the first and second support assemblies 36, 38 and held in place by screws 64. The coupling elements 65 are interfitted with the circular tracks 62 and slidably moveable thereabout so as to permit pivotal movement of the first and second support assemblies 36, 38 relative to the stationary support structure 34 and about the first axis C.

As best seen in FIG. 3A, means are provided in the reconfiguring apparatus 12 for stationarily holding each of the first and second support assemblies 36, 38 at both outer and inner end portions thereof at a selected one of a plurality of angular positions about the first axis C. In such manner, each of the first and second outer rolls 16, 18 is disposed at a selected one of a plurality of fixed reconfigured angular positions about the center roll 14.

In association with the inner end portion of each of the support assemblies 36, 38, the holding means includes a plurality of spaced holes 66, a set of spaced openings 68, and a set of fasteners 70. As is readily apparent in FIG. 3A, the respective sets of openings 68 and fasteners 70 are much fewer in number than the plurality of holes 66.

More particularly, the holes 66 are internally threaded in support frame 34 and formed in the inboard and outboard support plates 42 (only holes being seen in FIGS. 3A and 3B) of each support structure 34 to define a circular array concentrically about the first axis C. The openings 68 are formed in inner end portions of the inboard and outboard support plates 42 (only holes in the outboard support plate 42 being seen in FIGS. 3A and 3B) of each of the support assemblies 36, 38 and can be aligned with different sets of the threaded holes 66 in support structure 34 upon disposing of the support assemblies 36, 38 at different angular positions about the first axis C. The fasteners 70 are externally threaded bolts insertable through the aligned sets of openings 68 and into threaded holes 66. After insertion, the fasteners 70 are tightened for securing the support assemblies 36, 38 to the support structures 34 at different selected one of the angular positions about the first axis C.

In association with the outer end portion of each of the support assemblies 36, 38, the holding means includes a pair of support brackets 72, a plurality of spaced apertures 74, a set of spaced openings 76, and a set of fasteners 78. As is readily apparent in FIG. 3A, the respective sets of openings 76 and fasteners 78 are much fewer in number than the plurality of apertures 74.

More particularly, the support brackets 72 are mounted on the base 32 of the apparatus 12 and extend upright therefrom adjacent outer end portions of both the first and second support assemblies 36, 38. The spaced apertures 74 are formed through the respective support brackets 72. The openings 76 are formed in outer end portions of the inboard and outboard support plates 42 (only openings in the outboard support plate 42 being seen in FIG. 3A) of each of the support assemblies 36, 38 and can be aligned with different sets of the apertures 74 in support brackets 72 upon disposing of the support assemblies 36, 38 at different ones the angular positions about the first axis C. The fasteners 78 are insertable through the aligned sets of apertures 74 and openings 76. After insertion, the fasteners 78 are tightened for securing the support assemblies 36, 38 to the support brackets 72 at the different selected ones of the angular positions about the first axis C.

As pointed out earlier, FIG. 6 shows the multiple positions which can be assumed by the first and second outer rolls 16, 18 about the center roll 14. FIGS. 7-14 illustrate a representative sampling of some of the multiplicity of configurations the finishing rolls 14-16-18 can assume by adjusting the reconfiguring apparatus 12 of the present invention to adjust the angle at which the web B of plastic melt leaves the sheet die 22 and enters the primary nip 50A between the rolls 14, 16 and to vary the amount of contact of the opposite surfaces of the plastic sheet A with the respective finishing rolls 14-16-18. Also, in FIGS. 10 and 11, fabrication of plastic sheet A by casting is shown.

Figure 7:
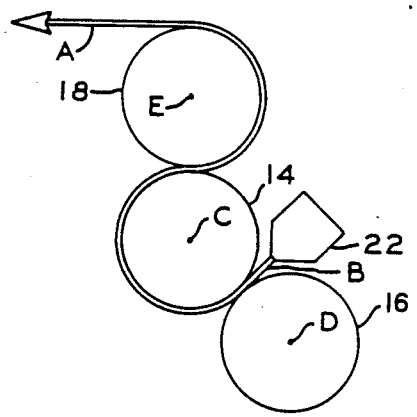
FIGS. 7-14 are schematic views of some of the multiplicity of configurations the finishing rolls can assume by adjusting the roll reconfiguring apparatus of the present invention.
Figure 8:
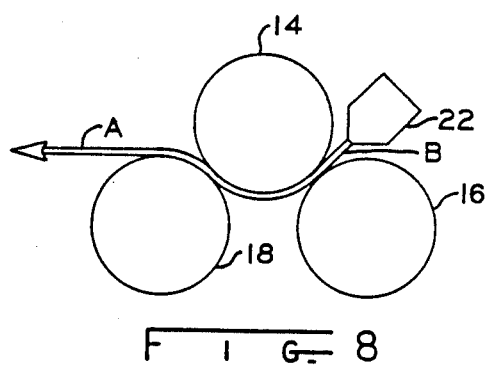
Figure 9:
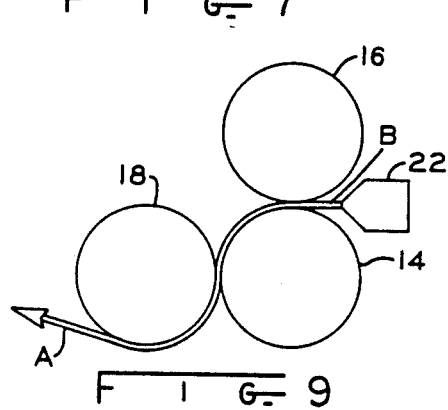
Figure 10:
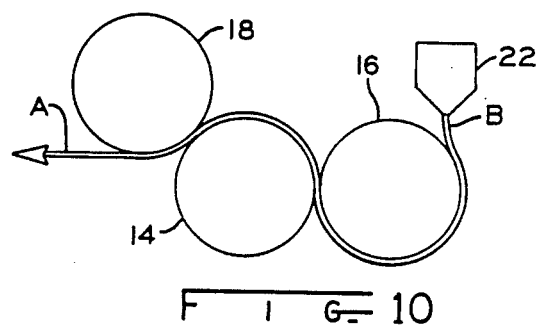
Figure 11:
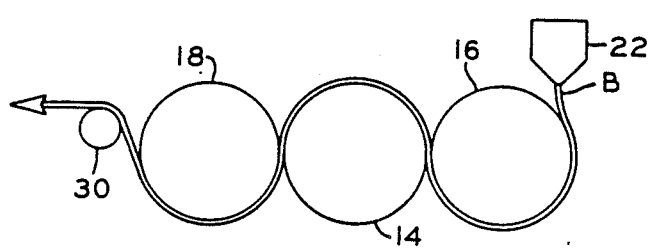
Figure 12:
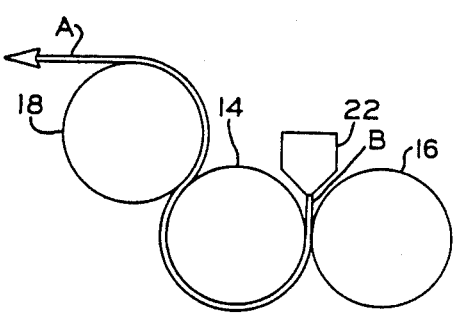
Figure 13:
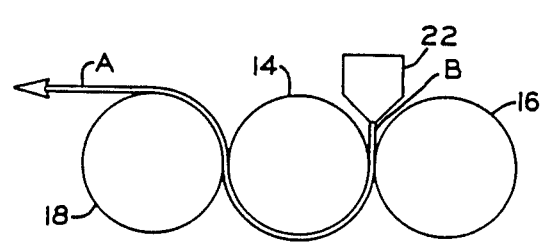
Figure 14:
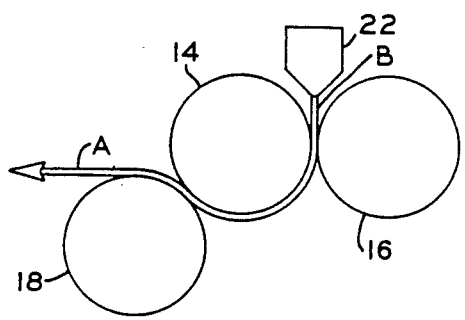

One of the very significant advantages of the present invention is the ability to control the time of contact of both sides of the plastic sheet with respective polishing rolls 16-18. For example, as the plastic is extruded and contacts the first roll, the side of the plastic web contacting that roll will be cooled and polished by adhering to the very smooth surface of the roll. However, the opposite side will begin to cool slightly due to contact with the air and may require more or less contact with its respective roll 18 in order to obtain a polished surface of optical quality. If more contact is required with rolls 14 and 18, the rolls can be configured as shown in FIG. 7. If less contact is needed to obtain the desired results, the rolls can be configured as shown in FIG. 8. If a vertically downward discharge from extruder 22 is desired, the rolls would be configured as shown in FIG. 12.

When running thin sheet, minimal contact with the rolls 14-16 may be all that is necessary and the system can be configured as shown in FIG. 8. However, if thicker material is being processed which requires longer contact with the polishing rolls, the rolls can be configured as shown in FIGS. 7, 9, 12, 13 and 14. This versatility in repositioning rolls 16-18 permits sheet of varying thickness to be run without changing the size of the rolls.

Although the invention has been shown in terms of three rolls, two of which are angularly adjustable about the third roll, four, five, six or any number of rolls could be angularly adjustable with respect to adjacent rolls.

Although the preferred embodiment of the invention comprises a bracket assembly for supporting the rolls at various discrete angular positions, the positions of the moveable rolls could be infinitely adjustable, such as by using hydraulic cylinders or the like to position them.

This would permit readjustment of the rolls during processing of the plastic sheet so that minor adjustments can be made "on the fly".

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

What is claimed is:

1. In a plastic sheet fabricating sheetline having at least three finishing rolls, a reconfiguring apparatus comprising:
   means for supporting a first one of the rolls in a stationary position for rotation about a first axis;
   means for supporting a second one of the rolls for rotation about a second axis to form a first nip with said first roll, said second roll supporting means being mounted to said first roll supporting means for angularly adjustable movement of the second roll relative to the first roll about said first axis through an adjustment angle sufficiently large to reconfigure substantially the angular position of the second roll relative to the first roll and maintain the first nip;
   means for supporting a third one of the rolls for rotation about a third axis to form a second nip with one of said first or second roll, said third roll supporting means being mounted to one of said first or second roll supporting means for angularly adjustable movement of the third roll relative to said one of the first or second roll about the corresponding one of said first or second axis through an adjustment angle sufficiently large to reconfigure substantially the angular position of the third roll relative to said one of the first or second roll independently of the adjustment of said second roll and means for extruding molten plastic material into one of said first and second nips.

2. The sheetline as recited in claim 1, further comprising:
   means for stationarily securing said second roll supporting means at a selected one of a multitude of discrete angular positions about said first axis for disposing the second roll at any one of a multitude of fixed reconfigured angular positions about the first roll; and
   means for stationarily securing said third roll supporting means at a selected one of a multitude of discrete angular positions about said one of aid first or second axis for disposing the third roll at any one of a multitude of fixed reconfigured angular positions about the corresponding first or second roll.

3. The sheetline as recited in claim 1, further comprising:
   means on each of said first, second and third roll supporting means for independently rotatably driving the corresponding rolls.

4. The sheetline as recited in claim 1, wherein said nips define respective gaps and further comprising:
   means on each of said second and third roll supporting means for independently adjusting the respective displacements of the second and third rolls from the first roll to define respective said nips therebetween and set and maintain constant the gaps of said nips.

5. The sheetline as recited in claim 1, wherein the first roll supported by said first roll supporting means is a center roll, whereas the second and third rolls supported by said second and third roll supporting means are outer rolls.

6. In a plastic sheet fabricating sheetline having at least three finishing rolls, an apparatus for reconfiguring said finishing rolls comprising:
   a base;
   a pair of support structures being spaced apart and mounted on said base, said support structures supporting a center one of said rolls in a stationary position therebetween and for rotation about a first axis;
   a first pair of support assemblies supporting a first outer one of said rolls therebetween for rotation about a second axis, said first outer and center rolls forming a first nip therebetween, said first support assemblies being spaced apart and mounted to said support structures for permitting angularly adjustable movement of said first outer roll relative to said center roll about said first axis through an adjustment angle sufficiently large to reconfigure substantially the angular position of said first outer roll relative to said center roll;
   a second pair of support assemblies supporting a second outer one of said rolls therebetween for rotation about a third axis, said second outer and center rolls forming a second nip therebetween, said second support assemblies being spaced apart and mounted to said support structures for permitting angularly adjustable movement of said second outer roll relative to said center roll about said first axis through an adjustment angle sufficiently large to reconfigure substantially the angular position of said second outer roll relative to said center roll independently of the adjustment of said first outer rolls; and means for extruding molten plastic material into one of said first and second nips.

7. The sheetline as recited in claim 6, further comprising: means on said support structures and said first and second support assemblies for coupling said support assemblies to said support structures to permit pivotal movement of said support assemblies relative to said support structures about said first axis and thereby said angularly adjustable movement of said first and second outer rolls relative to said center roll.

8. The sheetline as recited in claim 7, wherein said coupling means includes:
   a pair of circular tracks disposed on each of said support structures in substantially parallel relation to one another and concentrically about said first axis; and
   a plurality of coupling elements disposed on an end portion of each of said first and second support assemblies and being interfitted with said circular tracks and slidably movable thereabout to permit said pivotal movement of said first and second support assemblies about said first axis.

9. The sheetline as recited in claim 6, further comprising:
   means for stationarily holding said first support assemblies at a selected one of a plurality of discrete angular positions about said first axis for disposing said first outer roll at any one of a plurality of fixed reconfigured angular positions about said center roll; and means for stationarily holding said second support assemblies at a selected one of a plurality of discrete angular positions about said first axis for disposing said second outer roll at any one of a plurality of fixed reconfigured angular positions about said center roll.

10. The sheetline as recited in claim 9, wherein said holding means includes:

a plurality of spaced holes formed in each of said support structures and defined in a circular array concentrically about said first axis;

a set of spaced openings formed in an end portion of each of said first and second support assemblies for aligning with different sets of said holes in said support structures upon disposing of said support assemblies at different ones of said angular positions about said first axis; and a set of fasteners insertable through said aligned sets of openings and holes for securing said support assemblies at different ones of said angular positions about said first axis.

11. The sheetline as recited in claim 9, wherein said holding means includes:

a first pair of support brackets mounted on said base and disposed adjacent end portions of said first support assemblies, said first pair of support brackets having a plurality of spaced apertures formed therein;

a second pair of support brackets mounted on said base and disposed adjacent end portions of said second support assemblies, said second pair of support brackets having a plurality of spaced apertures formed therein;

a set of spaced openings formed in an end portion of each of said first and second support assemblies for aligning with different sets of said apertures in said first and second pair of brackets upon disposing of said support assemblies at different ones of said angular positions about said first axis; and a set of fasteners insertable through said aligned sets of openings and apertures for securing said support assemblies at different ones of said angular positions about said first axis.

12. The sheetline as recited in claim 6, further comprising:

means mounted on one of said support structures, one of said first support assemblies and one of said second support assemblies for independently rotatably driving said respective center and first and second outer rolls.

13. The sheetline as recited in claim 12, wherein each of said driving means is a motor.

14. The sheetline as recited in claim 6, wherein the nips define respective gaps and further comprising:

means mounted on each of said first and second support assemblies for independently adjusting the respective displacements of said first and second outer rolls from said center roll to define respective said nips therebetween and set and maintain constant the gaps of said nips.

15. The sheetline as recited in claim 14, wherein:

each of said first and second support assemblies includes a pair of spaced support plates, a bearing rotatably mounting one end of one of said outer rolls and being mounted by said support plates for sliding movement toward and away from center roll; and each of said adjusting means is an extendable and retractable actuator mounted and extending between said bearing and ends of said pair of support plates.

* * * * *